(12) United States Patent
Cheon

(10) Patent No.: US 6,234,240 B1
(45) Date of Patent: May 22, 2001

(54) FANLESS COOLING SYSTEM FOR COMPUTER

(76) Inventor: Kioan Cheon, 33531 7th Pl. SW., Federal Way, WA (US) 98023

( * ) Notice: Subject to any disclaimer, the term of this patent is extended or adjusted under 35 U.S.C. 154(b) by 0 days.

(21) Appl. No.: 09/346,281

(22) Filed: Jul. 1, 1999

(51) Int. Cl.$^7$ ..................................................... F28F 7/00
(52) U.S. Cl. ........................ 165/80.3; 165/80.4; 165/185; 257/714; 361/700; 62/3.2
(58) Field of Search ................... 165/80.3, 80.4, 165/104.33, 185; 361/700, 687; 257/714; 62/259.2, 3.2

(56) References Cited

U.S. PATENT DOCUMENTS

| | | | |
|---|---|---|---|
| 3,369,597 | * 2/1968 | Dronsuth et al. | 165/80.3 |
| 3,401,744 | * 9/1968 | Dubin et al. | 165/80.3 |
| 3,411,570 | * 11/1968 | Kleinhample, Jr. | 165/80.3 |
| 3,476,177 | * 11/1969 | Potzl | 165/80.3 |
| 3,481,393 | * 12/1969 | Chu | 62/3.2 X |
| 4,027,206 | * 5/1977 | Lee | 165/80.3 X |
| 4,315,300 | 2/1982 | Parmerlee et al. | 361/382 |
| 4,434,625 | 3/1984 | Cree | 62/199 |
| 4,535,386 | 8/1985 | Frey, Jr. et al. | 361/389 |
| 4,643,245 | 2/1987 | Smoot, III et al. | 165/47 |
| 4,644,443 | 2/1987 | Swensen et al. | 361/384 |
| 4,712,030 | * 12/1987 | Lakin et al. | 165/80.3 X |
| 4,739,445 | 4/1988 | Tragen | 361/384 |
| 4,866,743 | 9/1989 | Kroener | 378/4 |
| 5,186,605 | 2/1993 | Tracy | 415/119 |
| 5,190,097 | * 3/1993 | Selby et al. | 165/80.3 X |
| 5,195,576 | 3/1993 | Hatada et al. | 165/80.3 |
| 5,198,965 | * 3/1993 | Curtis et al. | 361/687 X |
| 5,243,493 | 9/1993 | Jeng et al. | 361/690 |
| 5,271,239 | 12/1993 | Rockenfeller et al. | 62/259.2 |
| 5,272,599 | 12/1993 | Koenen | 361/710 |
| 5,285,347 | 2/1994 | Fox et al. | 361/385 |
| 5,287,244 | 2/1994 | Hileman et al. | 361/687 |
| 5,315,480 | 5/1994 | Samarov et al. | 361/705 |
| 5,339,214 | 8/1994 | Nelson | 361/695 |
| 5,370,178 | 12/1994 | Agonafer et al. | 165/137 |
| 5,396,775 | 3/1995 | Rockenfeller et al. | 62/112 |
| 5,452,362 | 9/1995 | Burward-Hoy | 381/71 |
| 5,457,342 | 10/1995 | Herbst, II | 257/712 |
| 5,461,542 | * 10/1995 | Kosak et al. | 165/80.3 X |
| 5,473,508 | 12/1995 | Porter et al. | 361/695 |
| 5,482,113 | 1/1996 | Agonafer et al. | 165/137 |
| 5,671,120 | * 9/1997 | Kikinisi | 361/687 |
| 5,712,448 | * 1/1998 | Vandersande et al. | 62/3.2 X |
| 5,731,954 | 3/1998 | Cheon | 361/699 |
| 5,921,087 | * 7/1999 | Bhatia et al. | 62/3.2 |

* cited by examiner

Primary Examiner—Christopher Atkinson
(74) Attorney, Agent, or Firm—Joan H. Pauly

(57) ABSTRACT

A computer (2) has a plurality of heat-producing components, including a microprocessor chip (10). A heat transfer device (22) through which a liquid coolant (C) is circulated is mounted in heat exchanging contact on the component (10). The device (22) may be mounted directly or via a Peltier thermoelectric cooler (14) positioned between the component (10) and the device (22). Coolant (C) from the device (22) is circulated to and through a reservoir (42) mounted on an inner mounting surface (38) of a radiator (34). The radiator (34) has heat dissipating fins (40) exposed to ambient air. The power supply (6) of the computer (2) is mounted directly on the mounting surface (38) so that heat produced by the power supply (6) will be dissipated by the radiator (34). Preferably, a plurality of transistors (66) of the power supply (6) are mounted on the mounting surface (38) separately from the mounting board (64) of the power supply 6).

12 Claims, 4 Drawing Sheets

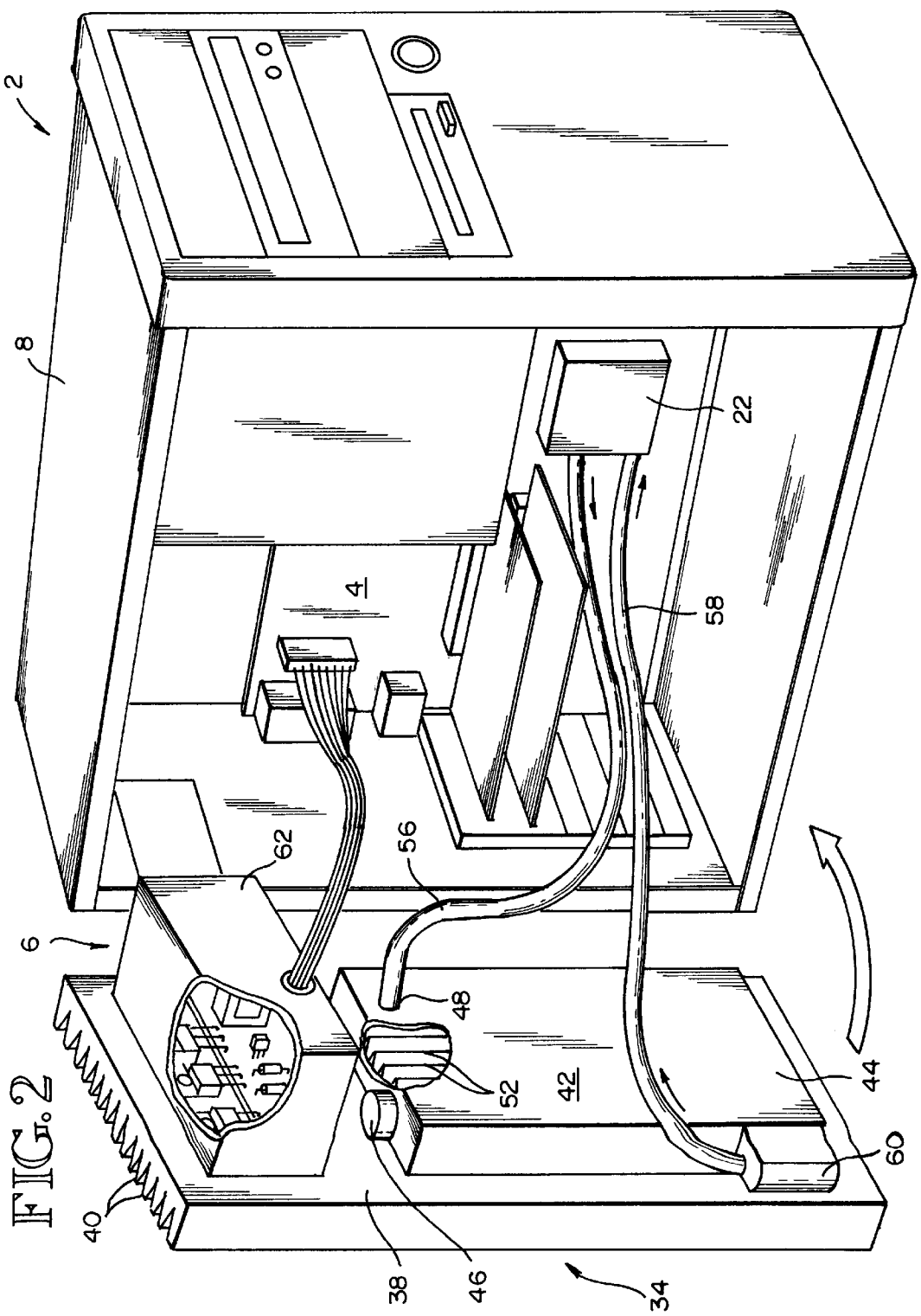

FANLESS COOLING SYSTEM FOR COMPUTER

TECHNICAL FIELD

This invention relates to cooling systems for computers and, more particularly, to such a system having a heat transfer device mounted on a computer component and communicating with a liquid coolant reservoir via first and second conduits, a radiator mounted on the outside of the computer housing and in heat exchanging contact with the reservoir, and mounting portions of the radiator onto which the computer power supply is directly mounted in heat exchanging contact with the radiator.

BACKGROUND OF THE INVENTION

It is well known that computers commonly include components that produce heat. Various types of cooling systems have been proposed for removing heat from the computer components to maintain the computer within operating temperature limits. The proposed systems include passive cooling systems and systems that employ gaseous and/or liquid coolants actively brought into heat transfer contact with the heat-generating components. There are a number of drawbacks associated with the presently known systems. These include noise and dust associated with systems having fans to create an airstream for cooling computer components or other elements (e.g., radiators) of the cooling system. They also include lack of sufficient cooling capacity or bulkiness and/or complexity resulting from efforts to increase cooling capacity.

The principal object of the present invention is to provide a cooling system for computers that avoids the drawbacks discussed above and is especially appropriate for use with small computers, including personal computers, workstations, servers, and small mainframes.

BRIEF SUMMARY OF THE INVENTION

The invention is directed toward a cooling system for a computer having a housing, a power supply, and at least one heat-producing component mounted inside the housing. According to an aspect of the invention, the cooling system comprises a heat transfer device having an outer surface in heat exchanging contact with a complementary outer surface of the component and an internal passageway extending between an inlet port and an outlet port. A radiator is mounted on the outside of the housing and has a plurality of heat transfer fins exposed to ambient air outside the housing. A reservoir is in heat exchanging contact with the radiator and extends into the housing. The reservoir has a casing, an inlet opening in the casing, and an outlet opening in the casing spaced from the inlet opening. A first conduit extends between the outlet port of the heat transfer device and the inlet opening of the reservoir. A second conduit extends between the outlet opening of the reservoir and the inlet port of the heat transfer device. The radiator has a mounting surface facing inwardly into the housing. The mounting surface is in direct heat exchanging contact with the power supply to allow heat produced by the power supply to be dissipated by the radiator.

The computer may include one or more heat-producing components. In the case of plural heat-producing components, the system may comprise a second heat transfer device having an outer surface in heat exchanging contact with a complementary outer surface of the second component. Like the first heat transfer device, the second device has an internal passageway extending between an inlet port and an outlet port. One of the conduits includes the internal passageway in the second heat transfer device. The heat-producing components may be various types of components. It is contemplated that in most applications of the invention the components will comprise at least one microprocessor.

The power supply may include a plurality of transistors. In such case, the preferred mounting arrangement for the power supply includes the mounting of the transistors directly on the mounting surface.

The heat transfer device may be in direct heat exchanging contact with the complementary outer surface of the component. Alternatively, a Peltier thermoelectric cooler may be positioned between the heat transfer device and the component. The Peltier cooler has a hot side and an opposite cold side. The cold side has an outer surface in heat exchanging contact with the complementary outer surface of the component. The outer surface of the heat transfer device is in heat exchanging contact with a complementary outer surface of the hot side. The system may further include additional arrangements of Peltier coolers and heat transfer devices mounted as described above to provide cooling of additional heat-producing components of the computer.

The cooling system of the invention has a number of advantages. The lack of a fan for moving air allows the system to operate essentially noise and dust free. The system has good cooling capacity and is highly versatile. The system may be installed either as part of original equipment or retrofitted into existing computers. Because of the relative simplicity and compact structure of the elements of the system, the system is especially well-adapted for use with small computers, such as personal computers, workstations, servers, and small mainframes. Whatever type of computer the system is installed in, the system provides reliable and low cost cooling.

These and other advantages and features will become apparent from the detailed description of the invention that follows.

BRIEF DESCRIPTION OF THE DRAWINGS

In the drawings, like element designations refer to like parts throughout, and:

FIG. 2 is a pictorial view of the computer shown in FIG. 1 with one side of the computer housing open to illustrate the elements of the computer and the cooling system mounted inside the computer housing.

DETAILED DESCRIPTION OF THE INVENTION

Figure 1:
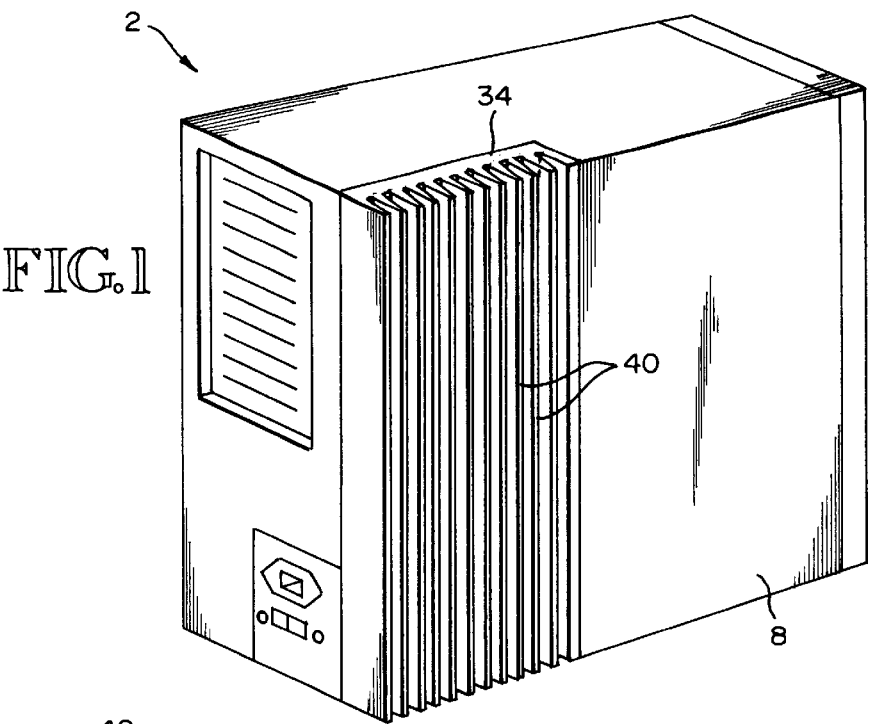
FIG. 1 is a pictorial view of a computer into which the preferred embodiment of the cooling system has been incorporated.

The drawings show the preferred embodiment of the cooling system and a modification thereof that are constructed according to the invention and constitute the best mode for carrying out the invention currently known to the applicant. In the drawings, the cooling system is shown being used in a small computer 2 having a mother board 4 and a power supply 6 that, in the assembled computer, are mounted in a housing 8. It is anticipated that the primary use for the system of the invention will be in computers of the type shown in FIG. 1 and similar computers. However, it is intended to be understood that the system may also be used to advantage in other types of computers.

The computer 2 includes a plurality of heat-producing components. These components include, for example, one or more microprocessors and one or more heat sinks to which one or more heat generating semiconductor components are mounted to transfer heat from the semiconductor components to the heat sink. A more specific example of a heat sink component is one that has a plurality of rectifiers mounted thereon.

Figure 3:
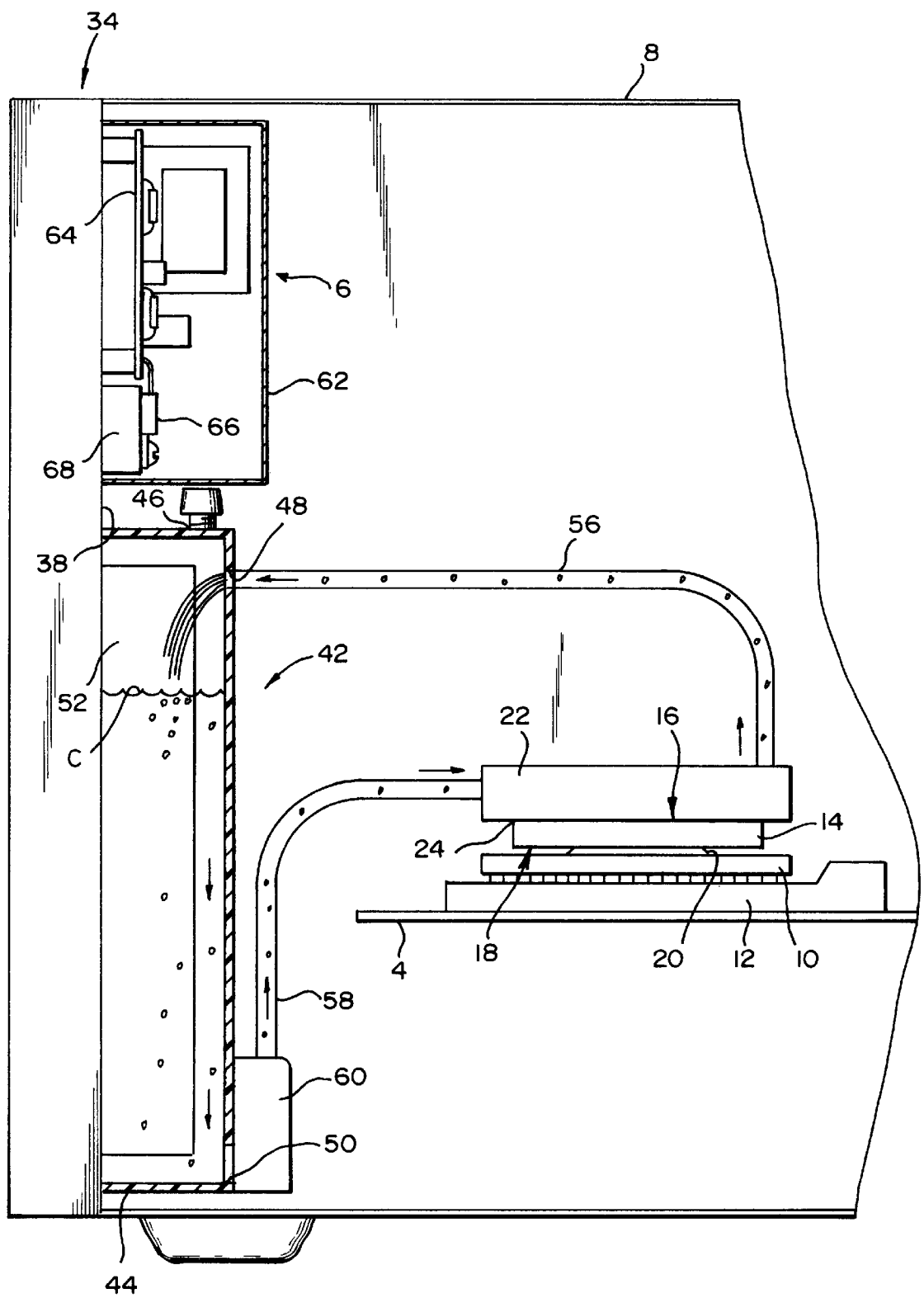
FIG. 3 is a partially schematic elevational view of a preferred embodiment of the cooling system having a single heat transfer device, with parts shown in section.

Referring to FIGS. 2 and 3, the system of the invention includes a heat. transfer device 22 mounted on a heat-producing component to cool the component. As shown in FIGS. 2 and 3, the component comprises a microprocessor chip 10 having a socket 12 for mounting it on the motherboard 4. The heat transfer device 22 has an outer surface in heat exchanging contact with a complementary outer surface of the microprocessor 10. In accordance with the invention, the heat transfer device 22 may be in direct contact with the component 10. Alternatively, as illustrated, the device 22 may be in contact with the component 10 via. a Peltier thermoelectric cooler 14. The Peltier device is of a known type having a hot side 16 and a cold side 18. The cold side 18 has an outer surface in heat exchanging contact with a complementary outer surface of the component 10. The reference numeral 20 in FIG. 3 indicates the interface 20 between the Peltier device and the component 10. The outer surface of the heat transfer device 22 is in heat exchanging contact with a complementary outer surface of the hot side 16. As shown in FIG. 3, the interface between the hot side 16 and the heat transfer device 22 is indicated by the reference numeral 24.

Figure 6:
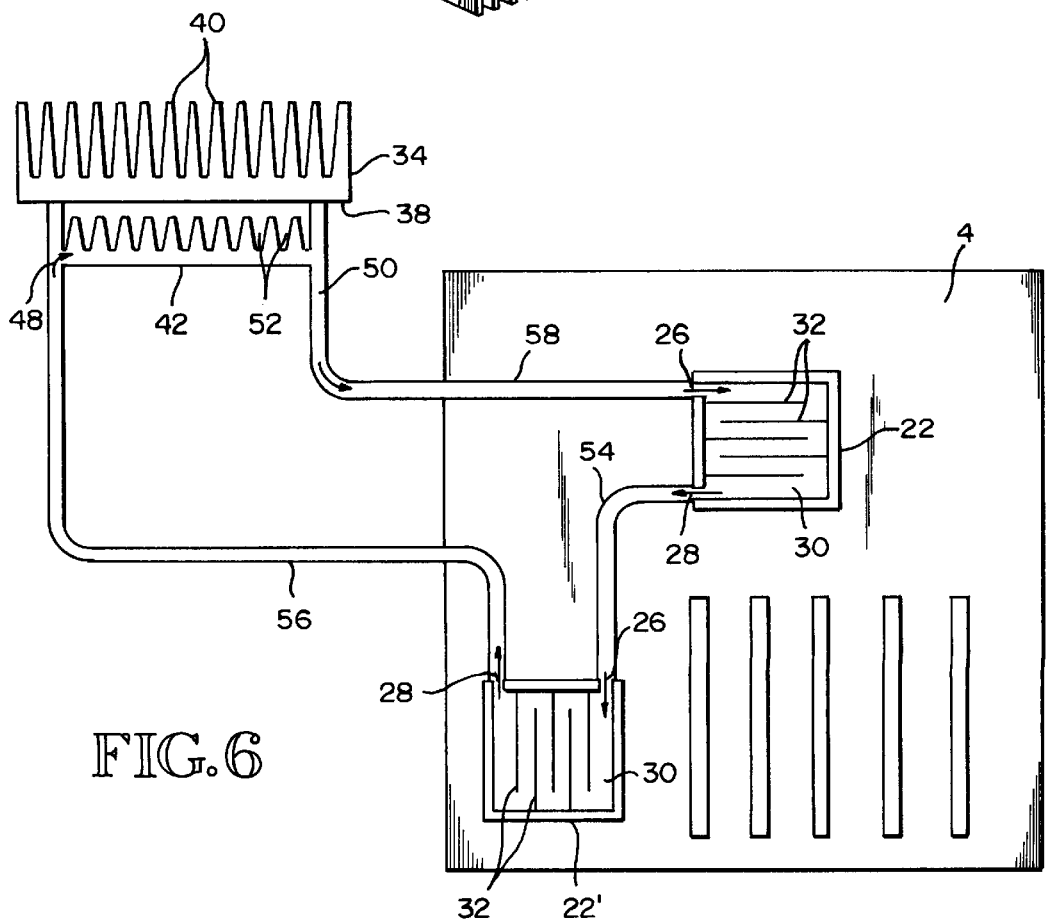
FIG. 6 is a schematic view illustrating a preferred embodiment of the cooling system in which two computer components are cooled by heat transfer devices.

The internal structure of the heat transfer device 22 is illustrated in FIG. 6. The device 22 has a hollow interior with an inlet port 26 and an outlet port 28. A serpentine internal passageway 30 extends between the inlet port 26 and the outlet port 28. The device 22 has interior walls 32 extending between the top and bottom walls of the device 22 and alternately from opposite sidewalls of the device 22 into the interior space. Each interior wall 32 is spaced from the sidewall opposite the sidewall from which it extends to allow liquid coolant flowing through the passageway 30 to flow around the free end of the interior wall 32. Thus, the serpentine passageway 30 is formed by the interior walls 32 along with the exterior sidewalls and top and bottom walls of the device 22.

The system of the invention also includes a radiator 34 mounted on the outside of the computer housing 8. The radiator 34 has a mounting surface 38 facing inwardly into the housing, as shown in FIGS. 2–4 and 6. The opposite side of the radiator 34 has a plurality of heat transfer fins 40 exposed to ambient air outside the housing 8, as best seen in FIGS. 1, 2, and 6. The radiator may form a door-like portion of the housing 8, as illustrated in FIGS. 1 and 2. The illustrated radiator 34 extends along about half the length of the side of the computer 2. Alternatively, the radiator could extend along the entire length of the side of the computer 2 and could be formed from a plurality of door-like structures rather than the single structure shown in FIGS. 1 and 2. As shown, the fins 40 are parallel spaced-apart members. However, as used herein, the term "fins" is intended to include various other surface configurations that provide increased surface area for heat dissipation, as well as the illustrated configuration of parallel or substantially parallel surfaces.

Another element of the system is a reservoir 42, shown in FIGS. 2, 3, and 6. The reservoir 42 is mounted on the inner mounting surface 38 of the radiator 34 and extends into the interior of the housing 8. The reservoir 42 is in heat exchanging contact with the radiator 34. This heat exchanging contact is preferably accomplished by mounting the reservoir 42 directly onto the mounting surface 38, as illustrated in FIGS. 2, 3, and 6. It would also be possible to provide the desired contact via a Peltier thermoelectric cooler positioned between the reservoir 42 and the mounting surface 38. However, such an arrangement would generally not be desirable since it would provide little or no increased benefit and would complicate the system and make it more expensive.

Referring to FIGS. 2 and 3, the reservoir 42 includes a casing 44. The reservoir 42 is provided with a fill opening 46 at the top of the casing 44 to permit introduction of a liquid coolant C into the interior of the reservoir 42. The coolant C may be water, automotive radiator fluid, or some other liquid capable of transferring heat. The fill cap may incorporate a safety valve. The portions of the casing 44 not adjacent to the mounting surface 38 may be transparent to allow easy observation of the coolant level in the reservoir 42. The adjacent wall is metal for good heat exchanging contact. Preferably, the reservoir 42 also has a drain opening at the bottom (not shown). In order to circulate the coolant C in the reservoir through the heat transfer device 22, the casing 44 is provided with an inlet opening 48 and an outlet opening 50 spaced from the inlet opening 48. Inside the casing 44 a plurality of fins 52 extend into the interior of the reservoir 42 to gather heat from coolant C circulating through the reservoir 42. Like the radiator fins 40, the reservoir fins 52 may also have various other configurations.

As shown in FIGS. 2 and 3, a conduit 56 extends from the outlet port 28 in the heat transfer device 22 to the inlet opening 48 in the reservoir 42. A second conduit 58 extends from the outlet opening 50 in the reservoir 42 to the inlet port 26 in the heat transfer device 22. A pump 60 is positioned at the outlet opening 50 to pump the coolant C from the reservoir 42 to and through the heat transfer 22 and back to the reservoir 42. The pump 60 may be of various known types.

FIG. 6 illustrates a modified arrangement in which the system includes two heat transfer devices 22, 22' associated with two heat-producing computer components mounted on the motherboard 4. The two devices 22, 22' are connected together in series with respect to circulation of the coolant C. The second device 22' has the same structure as the first device 22, including the ports 26, 28, passageway 30, and walls 32. It is in heat exchanging contact with its computer component in the manner discussed above in relation to the first device 22. As shown in FIG. 6, a third conduit 54 extends between the two heat transfer devices 22, 22' from the outlet port 28 in the first device 22 to the inlet port 26 in the second device 22'. In this arrangement, the two conduits 54, 56 and the internal passageway in the second device 22' can be considered a part of the conduit that extends from the outlet port 28 of the device 22 to the inlet 48 of the reservoir 42. For each of the devices 22, 22', intimate heat exchanging contact can be maintained between the device 22, 22' and the Peltier device 14 or the computer component and/or between the Peltier device 14 and the component by a heat transfer adhesive. Alternatively, a spring clip, such as the clip 16 shown in my U.S. Pat No. 5,731,954, granted Mar. 24, 1998, may be used for maintaining the desired contact.

An important feature of the invention is the direct mounting of the power supply 6 on the mounting surface 38 of the radiator 34. The direct mounting places the power supply 6 in direct heat exchanging contact with the mounting surface 38 to allow heat produced by the power supply 6 to be dissipated by the radiator 34. As shown in FIGS. 2–5, the power supply 6 includes a number of components, most of which are not relevant to the present invention. The power supply 6 has a casing 62 in which a board 64 is mounted to thereby mount a number of the components. The power supply 6 also includes a plurality of transistors 66 that are mounted separately from the board 64 directly on the mounting surface 38 of the radiator 34. As used herein, the term "directly" is intended to include the mounting arrangement shown in FIGS. 3 and 4 in which the transistors 66 are secured to an aluminum substrate 68 which is mounted on the mounting surface 38 in heat exchanging contact therewith.

Figure 5:
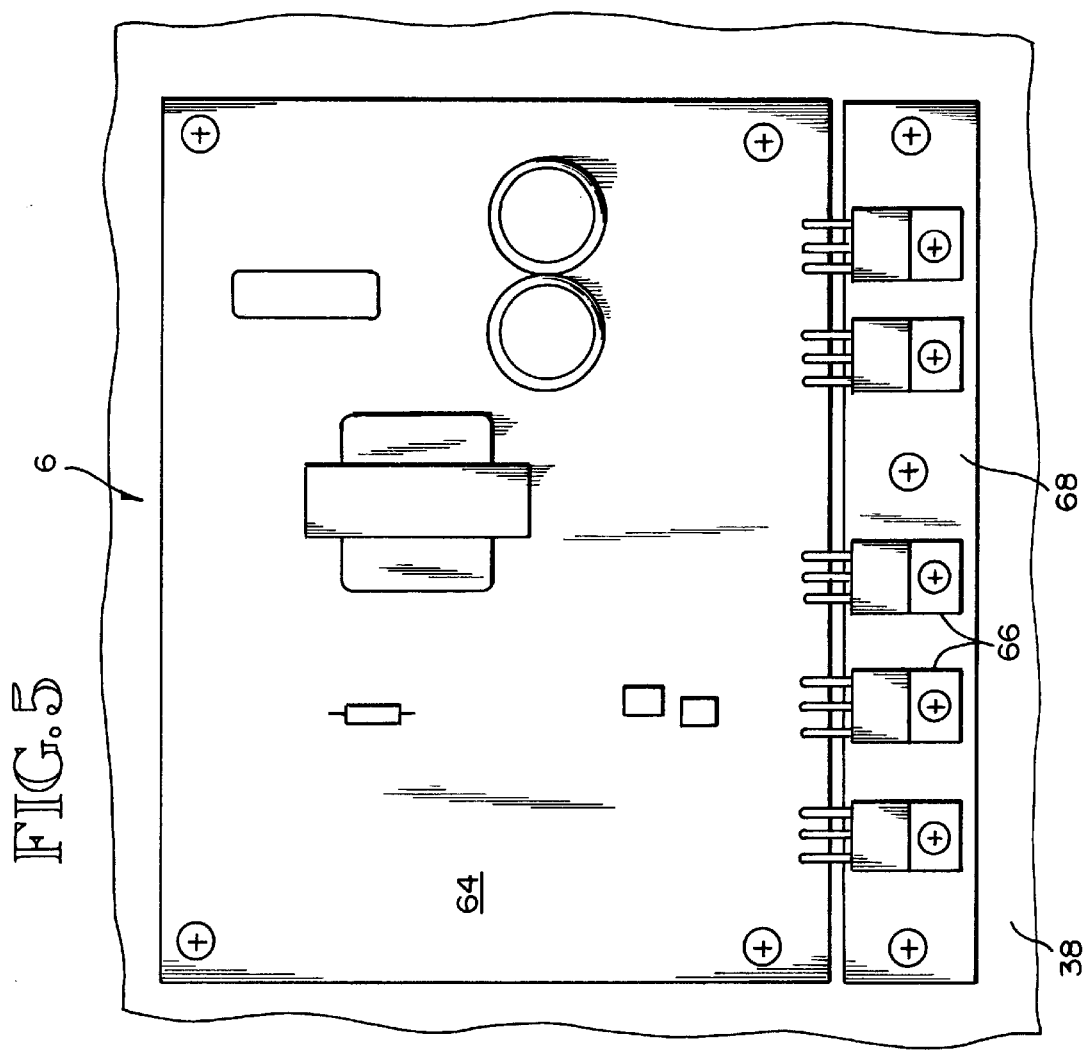
FIG. 5 is a front elevational view of the power supply mounted on the radiator, with the power supply casing omitted.
Figure 4:
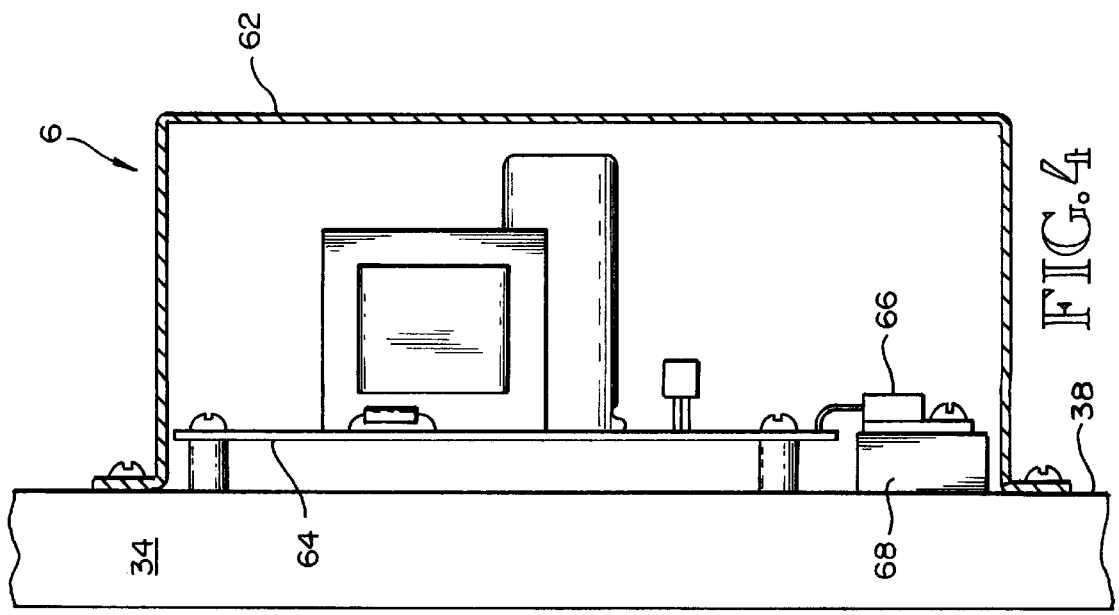
FIG. 4 is a side elevational view of the power supply and the mounting thereof, with the power supply casing shown in section.

The mounting arrangement for the power supply 6, best seen in FIGS. 3–5, efficiently dissipates heat produced by the power supply 6 while maintaining a maximized simplicity of the cooling system. The simplicity of the system helps minimize both cost and the space required by the system. The latter space-saving characteristic makes the system particularly suitable for various types of computers including those with very limited space available. In addition, the overall compactness and simplicity of the system help maximize its reliability and proper functioning under various environmental conditions.

The computer 2 and the heat-producing components illustrated and described herein are only examples of the various types of computers and heat-producing components that may advantageously be cooled by the system of the invention. It is intended to be understood that the system may be used in connection with a wide variety of computers and heat-producing components. In addition, the system may be used to cool a single component or two or more components in accordance with the needs in a particular installation.

Although the preferred embodiment of the invention has been illustrated and described herein, it is intended to be understood by those skilled in the art that various modifications and omissions in form and detail may be made without departing from the spirit and scope of the invention as defined by the following claims. The claims are to be interpreted in accordance with established rules, including the doctrine of equivalents.

What is claimed is:

1. A cooling system for a computer having a housing, a power supply, and at least one heat-producing component mounted inside the housing, comprising:
   a heat transfer device having an outer surface in heat exchanging contact with a complementary outer surface of the component and an internal passageway extending between an inlet port and an outlet port;
   a radiator mounted on the outside of the housing and having a plurality of heat transfer fins exposed to ambient air outside the housing; said radiator forming a door-like portion of the housing;
   a reservoir in heat exchanging contact with the radiator and extending into the housing, said reservoir having a casing, an inlet opening in the casing, and an outlet opening in the casing spaced from the inlet opening;
   a first conduit extending between the outlet port of said heat transfer device and the inlet opening of the reservoir; and
   a second conduit extending between the outlet opening of the reservoir and the inlet port of said heat transfer device;
   said radiator having a mounting surface facing inwardly into the housing, said reservoir being mounted on said mounting surface, and said mounting surface being in direct heat exchanging contact with the power supply, to allow heat from coolant circulated from said heat transfer device to said reservoir and back to said heat transfer device through said first and second conduits, and heat produced by the power supply, to be dissipated by said radiator.

2. The cooling system of claim 1, in which the computer has a second heat-producing component; the system comprises a second heat transfer device having an outer surface in heat exchanging contact with a complementary outer surface of the second component, and an internal passageway extending between an inlet port and an outlet port; and one of said conduits includes the internal passageway in said second heat transfer device.

3. The cooling system of claim 2, in which the components comprise at least one microprocessor.

4. The cooling system of claim 1, in which the component comprises a microprocessor.

5. The cooling system of claim 4, in which the power supply includes a plurality of transistors, and the transistors are mounted directly on said mounting surface.

6. The cooling system of claim 1, in which the power supply includes a plurality of transistors, and the transistors are mounted directly on said mounting surface.

7. A cooling system for a computer having a housing, a power supply, and at least one heat-producing component mounted inside the housing, comprising:
   a Peltier thermoelectric cooler having a hot side and an opposite cold side, said cold side having an outer surface in heat exchanging contact with a complementary outer surface of the component;
   a heat transfer device having an outer surface in heat exchanging contact with a complementary outer surface of said hot side, and an internal passageway extending between an inlet port and an outlet port;
   a radiator mounted on the outside of the housing and having a plurality of heat transfer fins exposed to ambient air outside the housing; said radiator forming a door-like portion of the housing;
   a reservoir in heat exchanging contact with the radiator and extending into the housing, said reservoir having a casing, an inlet opening in the casing, and an outlet opening in the casing spaced from the inlet opening;
   a first conduit extending between the outlet port of said heat transfer device and the inlet opening of the reservoir; and
   a second conduit extending between the outlet opening of the reservoir and the inlet port of said heat transfer device;
   said radiator having a mounting surface facing inwardly into the housing, said reservoir being mounted on said mounting surface, and said mounting surface being in direct heat exchanging contact with the power supply, to allow heat from coolant circulated from said heat transfer device to said reservoir and back to said heat transfer device through said first and second conduits, and heat produced by the power supply, to be dissipated by said radiator.

8. The cooling system of claim 7, in which the computer has a second heat-producing component; the system comprises a second Peltier thermoelectric cooler having a hot side and an opposite cold side, said cold side of said second cooler having an outer surface in heat exchanging contact with a complementary outer surface of the second component; the system also comprises a second heat transfer device having an outer surface in heat exchanging contact with a complementary outer surface of said hot side of said second cooler, and an internal passageway extending between an inlet port and an outlet port; and one of said conduits includes the internal passageway in said second heat transfer device.

9. The cooling system of claim 8, in which the components comprise at least one microprocessor.

10. The cooling system of claim 7, in which the component comprises a microprocessor.

11. The cooling system of claim 10, in which the power supply includes a plurality of transistors, and the transistors are mounted directly on said mounting surface.

12. The cooling system of claim 7, in which the power supply includes a plurality of transistors, and the transistors are mounted directly on said mounting surface.

* * * * *